United States Patent [19]

Fujinami

[11] Patent Number: 4,828,079
[45] Date of Patent: May 9, 1989

[54] HYDRAULIC RETARDER WITH PARKING BRAKE

[75] Inventor: Hideyuki Fujinami, Kitamoto, Japan

[73] Assignee: Akebono Brake Industry Co., Ltd., Tokyo, Japan

[21] Appl. No.: 194,273

[22] Filed: May 16, 1988

[30] Foreign Application Priority Data

May 19, 1987 [JP] Japan ................................ 62-122182
May 19, 1987 [JP] Japan ............................. 62-74494[U]

[51] Int. Cl.$^4$ ..................... F16F 11/00; F16D 57/00
[52] U.S. Cl. ..................................... 188/271; 60/341;
                                                    188/291; 192/57
[58] Field of Search ................. 188/271, 291, 70 R;
                                         192/3.23, 57; 60/341

[56] References Cited

U.S. PATENT DOCUMENTS 3,041,892 7/1962 Schjolin ..................... 192/3.23 X
4,437,550 3/1984 Nozawa ..................... 192/3.23 X

FOREIGN PATENT DOCUMENTS 707074 6/1941 Fed. Rep. of Germany .... 188/70 R
1235160 2/1967 Fed. Rep. of Germany .... 188/70 R
2158872 5/1973 Fed. Rep. of Germany ...... 188/271

Primary Examiner—George E. A. Halvosa
Attorney, Agent, or Firm—Oblon, Fisher, Spivak, McClelland & Maier

[57] ABSTRACT

For the improvement in the hydraulic retarder comprising a fixed member (1) of vehicle, a shaft (2), a housing (4), a vane chamber (3), a plurality of stator vanes (5) and a plurality of rotor vanes (7), a drum-like member (10), a plurality of clutch pistons (14a), (14b), (14c), a cylindrical member (6) a pair of arcuate brake shoes (16) and a parking lever (21) are added to function respectively.

9 Claims, 7 Drawing Sheets

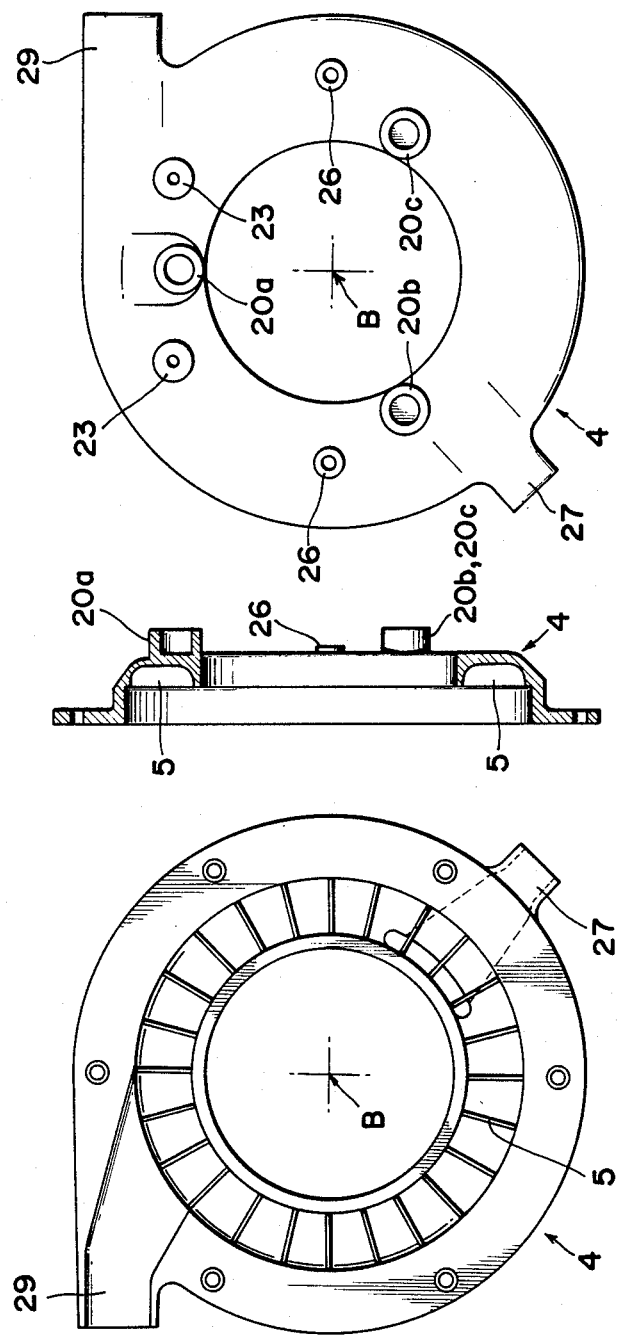

HYDRAULIC RETARDER WITH PARKING BRAKE

BACKGROUND AND SUMMARY OF THE INVENTION

The present invention relates to a device wherein the hydraulic retarder used for the large-sized vehicles such as buses, trucks, etc. and the parking brake are united to aim at the compactification and the space-saving.

Usually, there are three kinds of braking devices for cars, routine brake, parking brake and deceleration brake, depending on the purpose for use. Thereamong, the routine brake is a treadle brake and is used for deceleration and stopping of vehicle by braking whole wheels simultaneously. The parking brake is a manual brake and there are a type to work the same device as the routine brake for rear wheels through an auxiliary working mechanism and a mechanical center brake used for parking by fitting to the transmission or the propeller shaft, which can also serve as an assistance at the time of the breakdown of the routine brake and for stopping vehicle at the time of emergency.

For such parking brake, duo-servo type drum brake is used generally, wherein two brake shoes each laminated with a lining on an arcuate member are connected through a link inside a brake drum rotatable unitedly with a wheel axle and, by operating the parking lever, these shoes are pressed against the brake drum to stop the rotation of the axle.

Moreover, the decelerating device is to be used for large-sized trucks and buses. It is used because of being in danger of the lowering in the performance of brake due to the heat generation at the friction portions of brake with the routine brake alone when decending a long slope, and there are exhaustion brake, hydraulic retarder, electromagnetic retarder, etc. Thereamong, the hydraulic retarder (hereinafter referred to as retarder simply) shows a preferable characteristic as a decelerating device that the absorbing horsepower increases abruptly with an increase in the number of revolutions and is assembled most frequently into the transmission or the driving device of rear wheels.

The body of said retarder is so constructed, as shown in FIG. 8, that a plurality of rotor vanes (52) fixed radially making the axle (51) as a center and rotating unitedly with the axle (51) and a cylindrical vane chamber (54) provided in a ring form around the axle (51) by means of a case of vane chamber (53) surrounded said vanes (52) are provided, and, inside said vane chamber (54), stator vanes (55) fixed to the case of vane chamber (53) in opposition to a plurality of rotor vanes (52) are formed. When working the retarder, cooling oil is supplied to the oppositely facing space between the rotor vanes (52) in the vane chamber (54) and the stator vanes (55), thereby the energy of rotating rotor vanes (52) is transmitted to the circulating cooling oil as a heat to have the deceleration.

As described, the hydraulic retarder and the parking brake have been constructed conventionally as quite different devices despite being same braking devices. Since this is disadvantageous spatially, it has been earnestly desired to aim at the space-saving by constructing them unitedly. Furthermore, although the control of the working of hydraulic retarder has been performed conventionally through the flow rate of cooling oil supplied to the vane chamber, that is, the level of oil surface, the level-controlling device for oil surface is very expensive and yet heavy in weight. Therefore, a simple method has been sought. The purpose of the invention is to provide a hydraulic retarder with parking brake possible to dissolve the problems aforementioned at a stroke.

DETAILED DESCRIPTION OF THE INVENTION

An example of the invention will be illustrated in detail based on the diagrams attached.

Figure 1:
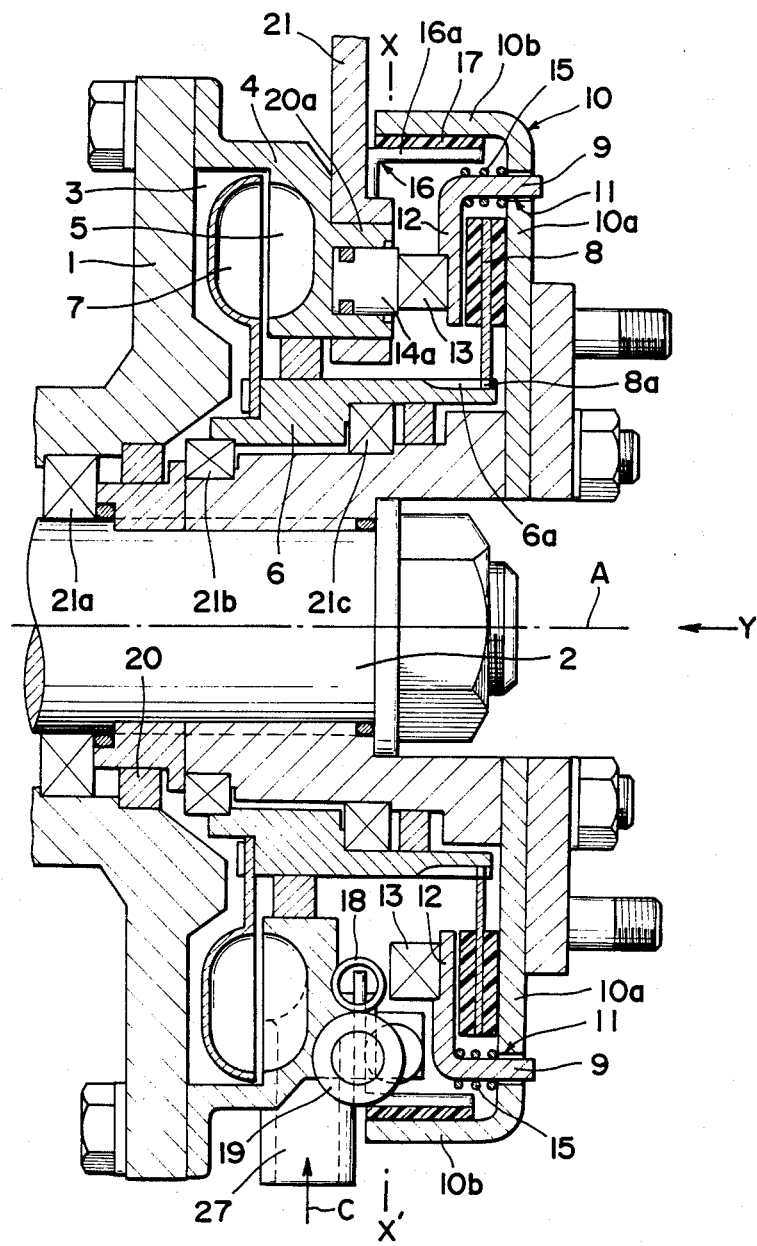
FIG. 1 is a sectioned diagram in side view showing one example of the invention.

As shown in FIG. 1, a ring-like and cylindrical vane chamber (3) of retarder is provided around a drive shaft (2), which is united with a transmission case (1) and which is surrounded by said transmission case (1) and a housing (4) fixed thereto by bolts. And, inside said vane chamber (3), stator vanes (5) of retarder are formed in plurality at said housing (4), which are disposed radially making the central axis of rotation (A) of the drive shaft (2) as a center. Moreover, a supplying port (27) of cooling oil and a discharging port (29) of cooling oil are formed at both ends of said housing (4), respectively (see FIG. 3).

Figure 2:
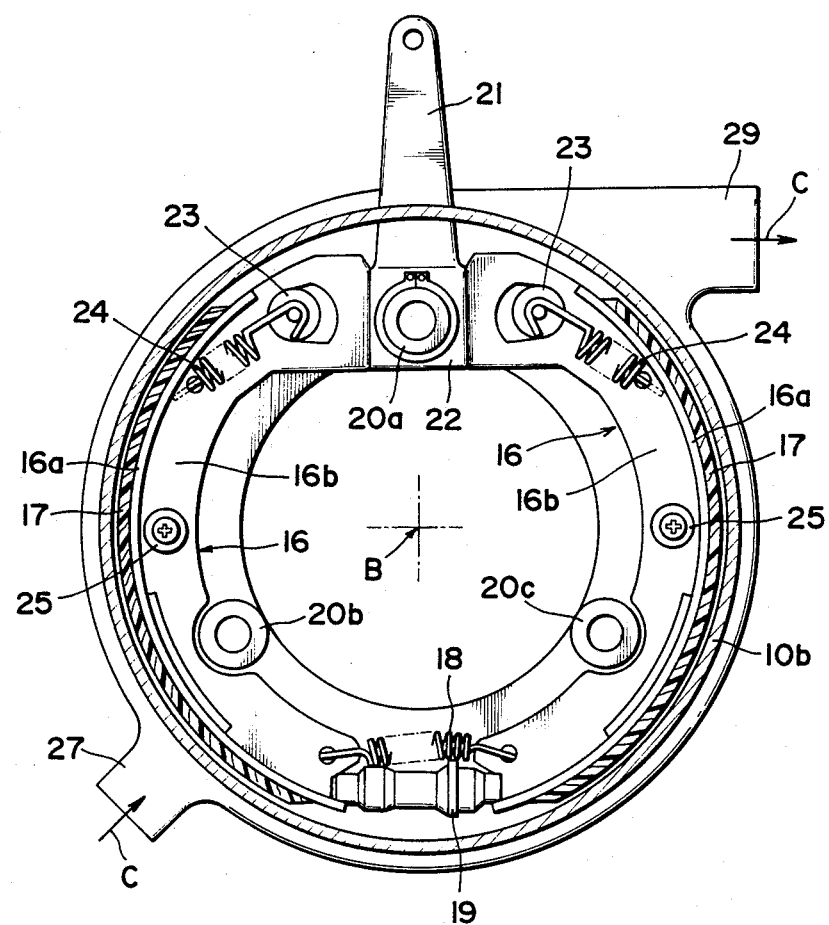
FIG. 2 is an arrow diagram from Y direction along X—X' line in FIG. 1, FIG. 3 (A), (B) and (C) show a housing wherein (A) is a cross section, (B) is a left side view of (A) and (C) is a right side view of (A), FIG. 4 (A) and (B) show a pressure plate wherein (A) is a ground plan and (B) is a cross section of (A) along X—X' line, FIG. 5 (A) and (B) show a clutch cover serving also as a brake drum wherein (A) is a ground plan and (B) is a cross section of (A) along Y—Y' line, FIG. 6 (A) and (B) show a brake shoe wherein (A) is a ground plan and (B) is a cross section of (A)
Figure 6A:
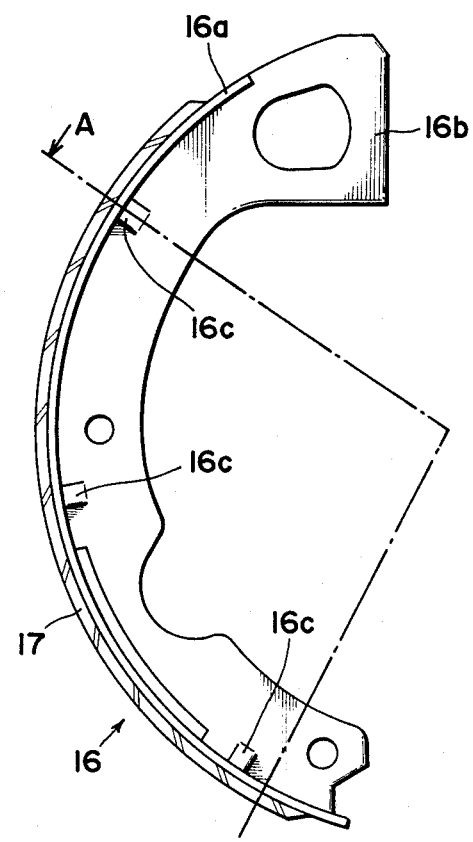
Figure 6B:
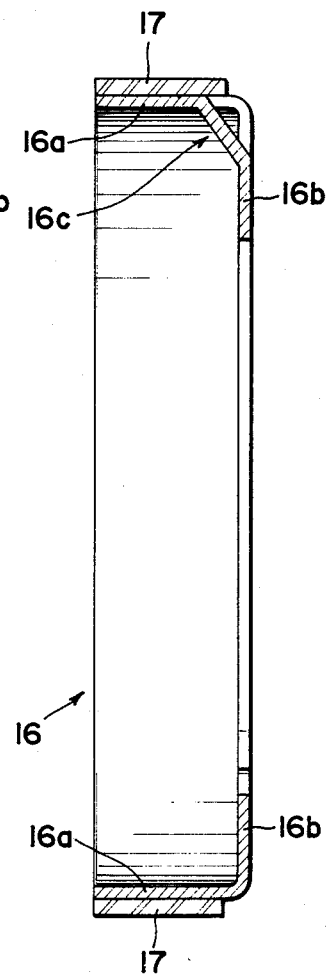

Furthermore, a rotatable cylindrical member (6) which is in opposition to said stator vanes (5) and fixes rotor vanes (7) provided in plurality radially from said central axis (A) at one end and which is extended from a portion between the inner circumference of said housing (4) and the outer circumference of the drive shaft (2) toward the opposite side of the transmission case (1) is provided. And a spline portion (6a) is formed at the outer circumference of the other end of said rotatable cylindrical member (6) and a ring-like clutch plate (8) is engaged in a spline form with said spline portion (6a) through a spline portion (8a) formed at the inner circumference thereof. Moreover, to the anti-retarder side of said clutch plate (8), closed one circular end of a clutch cover (10) serving also as a drum-like brake drum, which rotates unitedly with the drive shaft (2) and the other circular end of which is opened, is allowed to face oppositely as a disk-like clutch cover portion (10a). Further, a cylindrical brake drum portion (10b) of said clutch cover (10) is extended to the retarder side, and, on the inner side thereof, as shown in FIG. 1, FIG. 2 and FIG. 6, a pair of brake shoes (16),(16) being arcuate in plan view, the cross section of which is L-shape and each of which has a lining (17),(17) fixed to the outer face of rim portion (16a),(-

16a) thereof, are disposed. Each web portion (16b),(16b) supporting and reinforcing said rim portion (16a),(16a) is connected mutually by means of a coil spring (18) and an adjuster member (19) at lower end thereof, and upper end thereof is contacted with a cam (22) formed integrally with a parking lever (21) for parking brake supported rotatably by the cylindrical outer circumference of a clutch cylinder (20a) having the center on a vertical line passing the center of rotation (B) of the drive shaft (2). In FIG. 2, by allowing said parking lever (21) to rotate either to right or to left, the brake shoes are expanded outwardly through the cam (22) and pressed against the inner side of the brake drum portion (10b), thereby the rotation of the drive shaft (2) is stopped. And, by returning said parking lever (21) to the original position, as shown in FIG. 2 and FIG. 3, return springs (24),(24) connected to anchor pins (23),(23) formed unitedly with the housing (4) and to the brake shoes (16),(16) function and said brake shoes (16),(16) return rapidly. Besides, in FIG. 2 and FIG. 3, numeral (25),(25) shows a shoe-hold-down device supporting elastically each brake shoe (16),(16) to the housing (4) and numeral (26),(26) shows an engaging portion to engage each said device (25),(25). Moreover, in a plurality of cylinders (20a),(20b),(20c) formed at said housing (4), a plurality of clutch pistons (14a), (14b),(14c) movable to the direction of the central axis (A) of the drive shaft (2) are inserted. As shown in FIG. 1, FIG. 2 and FIG. 3, said clutch pistons (14a),(14b),(14c) are able to slide in three cylindrical clutch cylinders (20a),(20b),(20c), which are formed unitedly with the housing (4) and have the center at positions separated each at the angle of 120 degrees making the center of rotation (B) of said housing (4) as a center to the same direction as the central line of rotation (A) of the drive shaft (2).

Moreover, to the acting end of said pistons (14a),(14b),(14c), a ring-like pressure plate (12) is fixed through a ring-like clutch bearing (13), and said pressure plate (12) is allowed to face oppositely to the retarder side of the clutch plate (8).

Figure 4A:
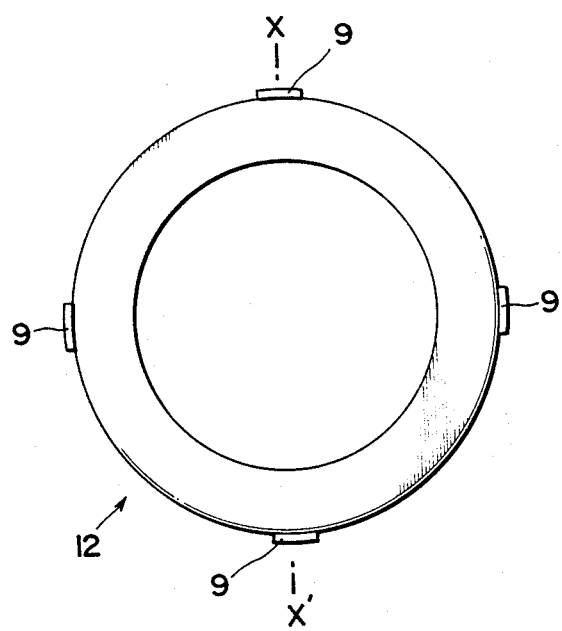
Figure 4B:
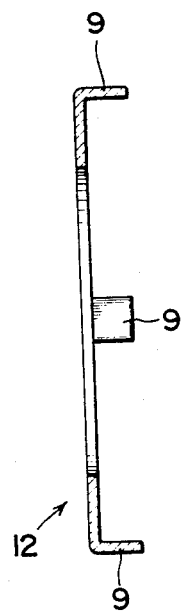
Figure 5A:
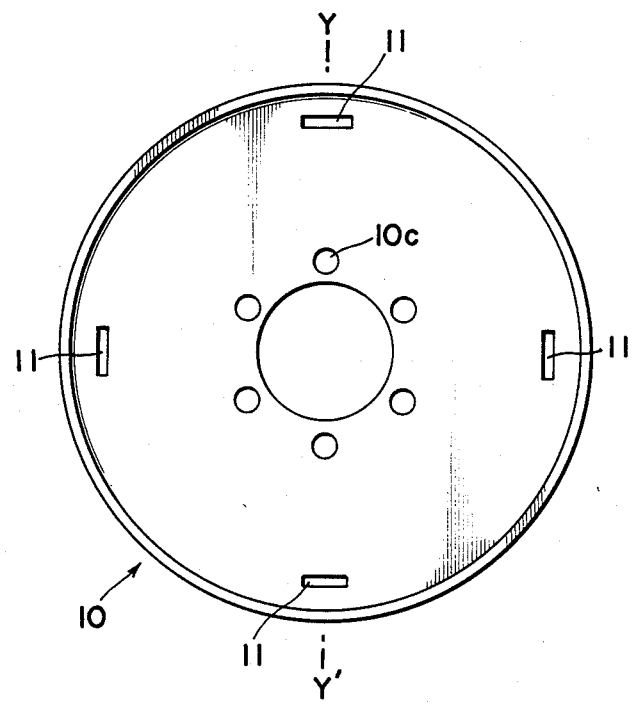
Figure 5B:
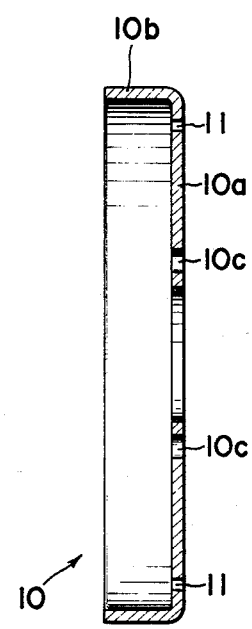

To the pressure plate (12) aforementioned, as shown in FIG. 4 (A) and (B), four pawls (9) are provided, which are disposed at even intervals on the outer circumference and formed by bending at right angles from said plate (12). As shown in FIG. 5 (A) and (B), four piercing holes (11) are provided through the clutch cover portion (10a) in a way that said pawls (9) pass through the clutch cover portion (10a) and can move smoothly in the direction of the central axis (A) of the drive shaft (2) when the pressure plate (12) is assembled so as the brake drum portion (10b) of the clutch cover (10) serving also as a brake drum and the pawls (9) to face oppositely each other, and, as in FIG. 1, a clutch return spring (15) is wound, which draws apart the pressure plate (12) from the clutch plate (8) when the working of the clutch pistons (14a),(14b),(14c) is released. Besides, in FIG. 1, numeral (20) is a slidable member serving also as a seal for making the vane chamber (3) of the retarder fluid-tight, numerals (21a),(21b), (21c) show bearings, respectively, and, in FIG. 5, numeral (10c) shows a hole for fitting the clutch cover (10).

Figure 7:
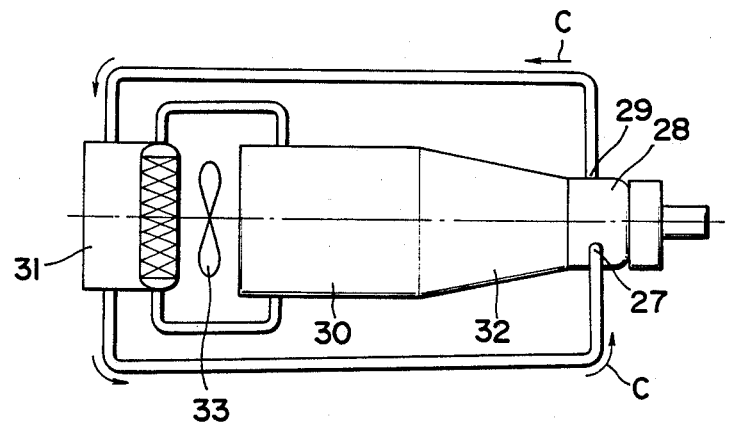
FIG. 7 is an illustrating diagram showing a cooling circuit.
Figure 8:
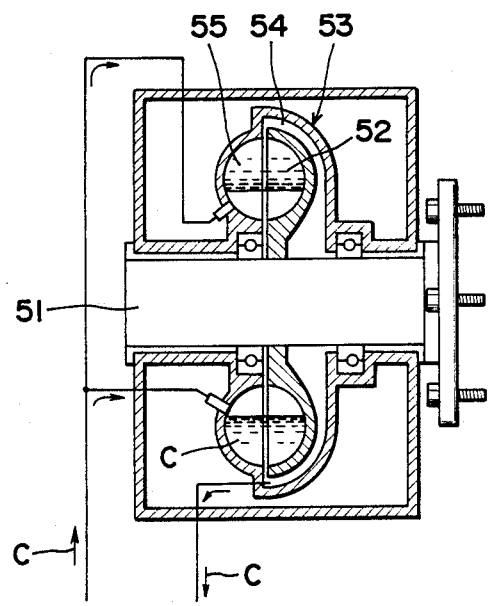
FIG. 8 is a sectioned diagram in side view showing the conventional example of hydraulic retarder.

Rotating the drive shaft (2) of the hydraulic retarder with parking brake constructed as above while supplying the cooling oil from supplying port (27) into the vane chamber (3) of the retarder and discharging it from the discharging port (29), cooling is made with a fixed quantity of said cooling oil either by utilizing a radiator lower tank (31) in the cooling circuit of engine (30) as shown in FIG. 7 or by utilizing an oil cooler prepared separately (not shown in figure) and, at the same time, the cooling oil is allowed to circulate, thereby the running-stopping of the hydraulic retarder (28) is easily possible with ON-OFF switching of the clutch caused by making the clutch piston (14a),(14b),(14c) ON-OFF. Besides, in the diagram, numeral (32) shows the transmission, numeral (33) shows a cooling fan and arrow (C) shows the flow of cooling oil.

Moreover, a pair of said brake shoes (12), the cross section thereof being L-shape and being arcuate in plan view, have a structure wherein the rim portion (16a) provided with the lining (17), the web portion (16b) supporting it and further three half-blank portions (16c) for improving the strength, provided at the connecting portion of them are molded with press unitedly as shown in FIG. 6. Therefore, they have a shape capable of utilizing effectively the space inside the drum portion (10b) of the clutch cover (10) serving also as a brake drum and still the cost for the manufacture also becomes low.

Since the rotatable cylindrical member (6) united with the rotor vanes (7) of the hydraulic retarder is extended from a portion between the housing (4) of the retarder and the drive shaft (2) or the propeller shaft to the exterior of the vane chamber (3), the ring-like clutch plate (8) rising at a right angle to said shaft is engaged in a spline form with said rotatable cylindrical member (6), and the pressure plate (12) and the disk-like clutch cover portion (10a) rotatable unitedly with the drive shaft (2) are provided oppositely on the retarder side of said clutch plate (8) and on the anti-retarder side thereof, respectively, the rotor vanes (7) rotate unitedly with the drive shaft (2) by pressing the pressure plate (12) against the clutch plate (8) through the clutch bearing (13) and by holding insertedly the clutch plate (8) between the clutch cover portion (10a) and the pressure plate (12) to operate the retarder when allowing the clutch pistons (14a),(14b),(14c) to work. As a result, inexpensive control of the retarder can be achieved by the mechanical clutch mechanism without the use of expensive level-controlling device for oil surface.

Moreover, since the outer edge portion of the circular clutch cover portion (10a) is extended to the retarder side in the direction of the axis of the drive shaft (2) to make it the brake drum portion (10b), the clutch cover portion (10a) as a constructing member of clutch controlling the retarder and the brake drum portion (10b) being the acting surface of brake as a constructing member of parking brake can be formed into only one part. Therefore, the retarder and the parking brake can be united resulting in the realization of the space-saving.

Furthermore, since a pair of said brake shoes (16) to be disposed inside the brake drum portion (10b) aforementioned are formed in L shape in section, the rim portion of brake shoe and the web portion supporting and reinforcing it can be united easily by molding with press and thus the reduction in cost can be aimed compared with the conventional brake shoes obtained by welding the rim portion with the web portion. In addition, by using said clutch cover (10) serving also as a brake drum, the inside of said clutch cover (10) can be utilized effectively in the compact device.

Further, since the pawls (9) which stride over the outside of the outer edge portion of the clutch plate (8) are extended from plural portions of the outer edge portion of the ring-like pressure plate (12), and they are interposed into a plurality of holes (11) pierced through the disk-like clutch cover portion (10a), the pressure plate (12) can rotate unitedly with the drive shaft (2) and the pressure plate (12) can move freely to the direction of the axis of the drive shaft (2). By means of this, when switching on the clutch, the clutch pistons (14a),(14b),(14c) have only to be worked, and, when switching off the clutch, the pressure plate (12) is to be drawn apart rapidly from the clutch plate (8) by the clutch return springs (15) wound around the pawls (9). Further, such pawls (9) can be formed unitedly with the pressure plate (12) and thus the fitting and the removal of said clutch return springs (15) are easy.

Further still, since the cylinders (20a),(20b),(20c), of the clutch pistons are formed unitedly with the housing (4) and the cylindrical outer circumference of the clutch cylinder (20a) disposed to the upper side on a vertical line passing the center of rotation of the drive shaft (2) etc. is utilized as an axis of rotation of the parking lever (21) for the parking brake, the inner space formed by the clutch cover (10) serving also as a drum-like brake drum can be utilized effectively and thus these parts are accommodated compactly. Moreover, since the room is created in space by adopting such construction, the shape of brake shoes (16) can be varied easily, if necessary.

Further, by taking such layout that one (20a) of the plural clutch cylinders (20a),(20b),(20c) and the parking lever (21) are placed at the uppermost position, the air-purging procedure of the hydraulic circuit in the clutch cylinders(20a),(20b),(20c) can be made easily.

As described, according to the invention, the hydraulic retarder and the parking brake can be made an united structure and lightening in weight and the compactification become possible to realize the space-saving and the reduction in cost. Therefore, the invention exerts remarkable effects industrially.

What is claimed is:

1. A hydraulic retarder with a parking brake characterized in that the hydraulic retarder is so constructed to include a rotatable shaft (2) rotating relative to a fixed member (1) of a vehicle and transmitting motive power to wheels, a housing member (4) fixed unitedly to said fixed member (1), a vane chamber (3) surrounded by said fixed member (1) and said housing member (4), a plurality of stator vanes (5) formed at said housing member (4) in said vane chamber (3) and a plurality of rotor vanes (7) disposed to face oppositely to the stator vanes (5) in said vane chamber (3) and to be rotatable around said rotatable shaft (2) and cooling liquid is introduced into said vane chamber (3) by means of the self-pumping action due to the rotation of the rotor vanes (7) or the action of a pump prepared separately, further including:
   a drum-like member (10) rotatable together with said rotatable shaft (2) at the exterior of said vane chamber (3),
   a plurality of clutch pistons (14a),(14b),(14c) fitted into a plurality of cylinders (20a),(20b),(20c) provided to said housing member (4),
   a cylindrical member (6), one end thereof being located in said vane chamber (3) and simultaneously the other end thereof being located at the exterior of said vane chamber (3) and being rotatable between the outer circumference of said rotatable shaft (2) and the inner circumference of said housing member (4),
   said cylindrical member (6) having said one end fixed to a plurality of said rotor vanes (7) and said other end supporting a clutch plate (8) lying between a pressure plate (12) pressed by said clutch pistons (14a),(14b),(14c) and a closed end portion (10a) of said drum-like member (10),
   a pair of arcuate brake shoes (16) disposed at the inner side of a cylindrical portion (10b) of said drum-like member (10), and
   a parking lever (21) supported rotatable onto the cylindrical outer circumference of one (20a) of said plurality of cylinders of said housing member (4) and pressing a pair of said brake shoes (16) against the inner side of the cylindrical portion (10b) of said drum-like member (10).

2. The hydraulic retarder with parking brake according to claim 1, wherein said pair of brake shoes (16) have a L-shape in section.

3. The hydraulic retarder with parking brake according to claim 2, wherein said pair of brake shoes (16) have a structure so constructed to include a rim portion (16a) provided with a lining (17), a web portion (16b) supporting it and further a half-blank portion (16c), for improving the strength disposed at the connecting portion thereof are molded with press unitedly.

4. The hydraulic retarder with parking brake according to claim 1, wherein said clutch plate (8) is supported by said other end of said cylindrical member (6) through spline engagement and is rotatable together with said cylindrical member (6) and slidable in the direction of an axis relative to said cylindrical member (6).

5. The hydraulic retarder with parking brake according to claim 1, wherein said pressure plate (12) is ring-like in shape and has a plurality of pawls (9) formed by bending at right angles from said pressure plate (12) on the outer circumference thereof and said drum-like member (10) has a plurality of holes (11) formed to accommodate the pawls (9) at said closed end portion (10a) thereof.

6. The hydraulic retarder with parking brake according to claim 5, wherein a spring (15) to draw apart said pressure plate (12) from said clutch plate (8) when releasing the working of said clutch pistons (14a),(14b),(14c) is wound around said each pawl (9).

7. The hydraulic retarder with parking brake according to claim 1, wherein a plurality of said cylinders (20a),(20b),(20c) of said housing member (4) are formed by three in number at the positions separated each at the angle of 120 degrees making the center of rotation of said rotatable shaft (2) as a center and one (20a) of them has the center at the upper side on a vertical line passing the center of rotation of said rotatable shaft (2), onto the outer circumference thereof being supported said parking lever (21) rotatable.

8. The hydraulic retarder with parking brake according to claim 1, 2 or 3, wherein said pair of brake shoes (16) are supported elastically on said housing member (4) through a shoe-hold-down device (25).

9. The hydraulic retarder with parking brake according to claim 1, 2, 3 or 8, wherein said pair of brake shoes (16) are connected to each other at one end thereof by a coil spring (18) and an adjuster member (19) and the other end is contacted with a cam (22) provided unitedly with said parking lever (21).

* * * * *